United States Patent [19]

Butler et al.

[11] Patent Number: 5,307,272
[45] Date of Patent: Apr. 26, 1994

[54] MINEFIELD RECONNAISSANCE AND DETECTOR SYSTEM

[75] Inventors: Millard T. Butler; Steven P. Cave; James D. Creager; Charles M. Johnson; John B. Mathes; Kirk J. Smith, all of Albuquerque, N. Mex.

[73] Assignee: The United States of America as represented by the United States Department of Energy, Washington, D.C.

[21] Appl. No.: 746,535

[22] Filed: Aug. 19, 1991

[51] Int. Cl.⁵ .............................. G01V 5/00
[52] U.S. Cl. .................. 364/424.02; 364/424.01; 364/420; 364/421; 364/423; 364/554; 180/169; 340/568; 280/135
[58] Field of Search ............ 364/424.01, 424.02, 364/423, 420, 421, 422, 554; 180/167, 168, 169; 340/568; 280/735

[56] References Cited

U.S. PATENT DOCUMENTS

| | | | |
|---|---|---|---|
| 4,021,725 | 5/1977 | Kirkland | 324/3 |
| 4,090,243 | 5/1978 | Kotera et al. | 364/526 |
| 4,709,213 | 11/1987 | Podhrasky | 324/329 |
| 5,025,150 | 6/1991 | Oldham et al. | 250/253 |

Primary Examiner—Thomas G. Black
Assistant Examiner—Susan I. Wieland
Attorney, Agent, or Firm—Miguel A. Valdes; Roger S. Gaither; William R. Moser

[57] ABSTRACT

A multi-sensor system (10) for detecting the presence of objects on the surface of the ground or buried just under the surface, such as anti-personnel or anti-tank mines or the like. A remote sensor platform (12) has a plurality of metal detector sensors (22) and a plurality of short pulse radar sensors (24). The remote sensor platform (12) is remotely controlled from a processing and control unit (14) and signals from the remote sensor platform (12) are sent to the processing and control unit (14) where they are individually evaluated in separate data analysis subprocess steps (34, 36) to obtain a probability "score" for each of the pluralities of sensors (22, 24). These probability scores are combined in a fusion subprocess step (38) by comparing score sets to a probability table (130) which is derived based upon the historical incidence of object present conditions given that score set. A decision making rule is applied to provide an output which is optionally provided to a marker subprocess (40) for controlling a marker device (76) to mark the location of found objects.

14 Claims, 6 Drawing Sheets

MINEFIELD RECONNAISSANCE AND DETECTOR SYSTEM

The invention described herein arose in the course of, or under, contract No. DE-AC08-88NV10617 between the United States Department of Energy and E.G.& G. Energy Measurements, Inc.

BACKGROUND OF THE INVENTION

The present invention relates generally to the field of electronic detection apparatus and more particularly to a system for the detection of objects concealed within and close to the surface of the earth. The predominant current usage of the minefield reconnaissance and detector system of the present invention is as a means for detecting surface and subsurface ordnance and the like concealed in a subject field.

The detection of concealed mines has been a subject of great interest among military personnel. Similarly, practitioners in other fields have found occasion to use technology originally developed for the purpose of mine detection. An example is the detection of buried toxic waste containers during toxic waste cleanup operations. The most widely practiced technology has been conventional "metal detector" devices which are carried by an operator and which provide the operator with an audible and/or visible signal roughly corresponding to the disruption of a magnetic field occasioned by a ferromagnetic object. A disadvantage of this approach has been that the operator is required to make decisions about whether the received signal is truly indicative of a buried mine. This is particularly difficult because the signal strength varies not only with the size of a buried object, but also with the depth at which the object is buried, the material composition of the object, and the characteristics of the soil in which the object is buried. In short, the probability of a wrong decision is appreciable and, given that such conventional prior art devices are usually carried upon the person of the operator, the consequences of a "false negative" decision while searching for buried land mines can indeed be grave.

A possible improvement to conventional methods for mine detection which has been tried has been to remove the operator from the vicinity of the detector apparatus. However, attempts to accomplish this have previously been less than successful. It would seem that this simple expedient must be tied to some improvement in the data gathering and decision making processes in order to be successful, if for no other reason than the fact that the removal of the operator from the area of danger may have some effect on the operator's willingness to commit to decisions.

Attempts to advance the art have involved the use of different technologies, such as radar and infra-red detection devices. To the inventors' knowledge, this approach has not resulted in an improved mine detection apparatus, since these technologies have not proven to be generally superior to conventional metal detector technology for the purpose. Furthermore, attempts to combine technologies have only resulted in an increased likelihood of "false positive" indications, to the extent that such combinations have been impractical to use. All such attempts to supplement one technology with another for this purpose, to the inventors' knowledge, have merely provided alternative sensing means, any one of which might provide an indication that a mine is present. Therefore, such attempts have resulted in a greatly increased number of false positive indications without providing the benefit of a sufficiently decreased number of false negative indications. It is important to note that all such prior attempts to combine technologies for this purpose within the inventors' knowledge have been within the realm of undisclosed experiments within the project which has resulted in the present invention and, thus, are not prior art with respect to the present invention.

All of the prior art mine detection systems within the inventors' knowledge have merely provided data which must be interpreted by a human operator, or else have been subject to an unacceptable rate of false positive or false negative errors.

No prior art mine detection system to the inventors' knowledge has successfully gathered and analyzed data so as to provide a reliable yes/no (mine/no mine) indication to an operator. All successful applications to date have required human decision making and the stress and potential for human error attendant thereto, or else have been subject to an unacceptable error rate.

SUMMARY OF THE INVENTION

Accordingly, it is an object of the present invention to provide a means for detecting articles concealed on or within the ground which furnishes a yes/no indication that is reliable within acceptable limits.

It is another object of the present invention to provide a means for detecting articles concealed on or within the ground which will detect even those articles which might be overlooked using a conventional metal detector.

It is still another object of the present invention to provide a means for detecting articles concealed on or within the ground which enables an operator to be located at a safe distance from the detection site.

It is yet another object of the present invention to provide a means for detecting articles concealed on or within the ground which is adaptable to variable soil conditions.

It is still another object of the present invention to provide a means for detecting articles concealed on or within the ground which will detect nonmetallic as well as metallic objects.

It is yet another object of the present invention to provide a means for detecting articles concealed on or within the ground which provides a yes/no indication which is based upon an assessment of the costs of a false positive error relative to the costs of a false negative error.

It is still another object of the present invention to provide a means for detecting articles concealed on or within the ground which relieves an operator from the stress of decision making and which is thus normally not susceptible to human error in the decision making process.

Briefly, the preferred embodiment of the present invention is a mine detector having a remotely controlled self-propelled sensor platform with a plurality of short pulse radar sensors and a plurality of conventional metal detector sensors. Data is sent from the sensor platform to a information processing system connected to the sensor platform by an umbilical cable. Data from the metal detector sensors is analyzed to provide a first probability estimate of the likelihood of the presence of a mine. Data from the short pulse radar is analyzed twice, in order to optimally detect objects on and under the surface, to provide a second probability estimate of the likelihood of the presence of a mine. The first probability estimate and the second probability estimate are then assimilated into a decision making process which also takes into consideration the relative costs of alternative incorrect decisions.

An advantage of the present invention is that a reliable yes/no indication of the presence of objects concealed on or within the ground is provided.

A further advantage of the present invention is that objects which might be overlooked using conventional metal detectors may be detected.

Yet another advantage of the present invention is that an operator can be located at a safe distance from the situs of mine detection operations.

Still another advantage of the present invention is that subsurface objects can be reliably detected regardless of the variable qualities of the soil in which those objects are buried.

Yet another advantage of the present invention is that nonmetallic as well as metallic objects can be detected.

Still another advantage of the present invention is that decisions are based upon an assessment of the costs of a false positive error relative to the costs of a false negative error.

Yet another advantage of the present invention is that the operator is relieved of the stress of decision making and, therefore, incorrect decisions due to human error are essentially eliminated.

These and other objects and advantages of the present invention will become clear to those skilled in the art in view of the description of the best presently known modes of carrying out the invention and the industrial applicability of the preferred embodiments as described herein and as illustrated in the several figures of the drawing.

DETAILED DESCRIPTION OF THE INVENTION

The best presently known mode for carrying out the invention is a minefield reconnaissance and detector system. The predominant expected usage of the inventive minefield reconnaissance and detector system is in military applications, particularly in the clearing of minefields wherein an ability to reliably detect and mark the position of surface and subsurface ordnance is required.

Figure 1:
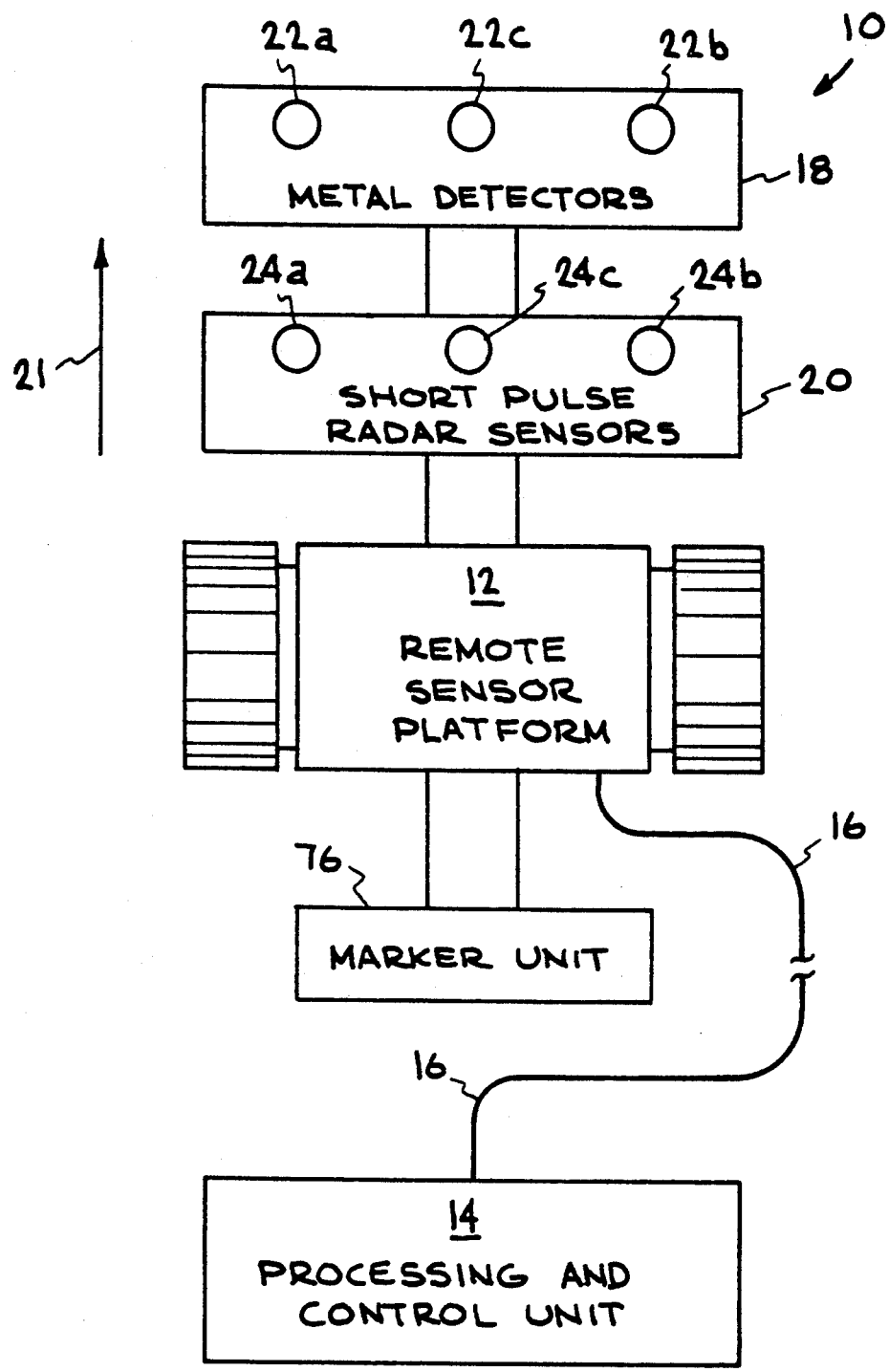
FIG. 1 is a block diagrammatic view of a minefield reconnaissance and detector system, according to the present invention.

The minefield reconnaissance and detector ("MIRADOR") system of the presently preferred embodiment of the present invention is illustrated in a diagrammatic view in FIG. 1 and is designated therein by the general reference character 10. A remote sensor platform 12 is a remotely controlled, self propelled vehicle which is connected to a processing and control unit 14 by means of an umbilical cable 16. The umbilical cable 16 carries signals for controlling the remote sensor platform 12 from the processing and control unit 14, and further carries data between the remote sensor platform 12 and the processing and control unit 14 as will be described hereinafter.

The remote sensor platform 12 of the presently preferred embodiment 10 of the invention is propelled by a small diesel engine and transmission combination (not shown) which provides for movement of the remote sensor platform 12 in both forward and reverse directions. The remote sensor platform 12 also has an engine driven alternator (not shown) for providing electrical power to the electrical and electronic components thereof.

The remote sensor platform 12 of the presently preferred embodiment 10 of the present invention has a first sensor array 18 and a second sensor array 20. The first sensor array 18 is approximately 1.5 meters (5 feet) long and is positioned perpendicular to a forward direction of travel 21 of the remote sensor platform 12. The first sensor array 18 has three conventional metal detector sensors 22 arranged with a first metal detector sensor 22a and a second metal detector sensor 22b at the ends thereof and a third metal detector sensor 22c in line with the first metal detector sensor 22a and the second metal detector sensor 22b and midway therebetween. The above described arrangement of the metal detector sensors 22, used according to the method described herein, is more than sufficient to provide detection of objects lying under any point between the first metal detector sensor 22a and the second metal detector sensor 22b.

The second sensor array 20 has thereon three conventional short pulse radar sensors 24 with a first short pulse radar sensor 24a, a second short pulse radar sensor 24b and a third short pulse radar sensor 24c positioned respectively behind, in relation to a direction of forward travel 26, the metal detector sensors 22a, 22b and 22c.

The processing and control unit 14 is a conventional military instrument shelter, Which may be transported to a site by means of a truck, and has generators (not shown) and the like for supplying power, as well as conventional computers and instrumentation for performing the processes described hereinafter.

Figure 2:
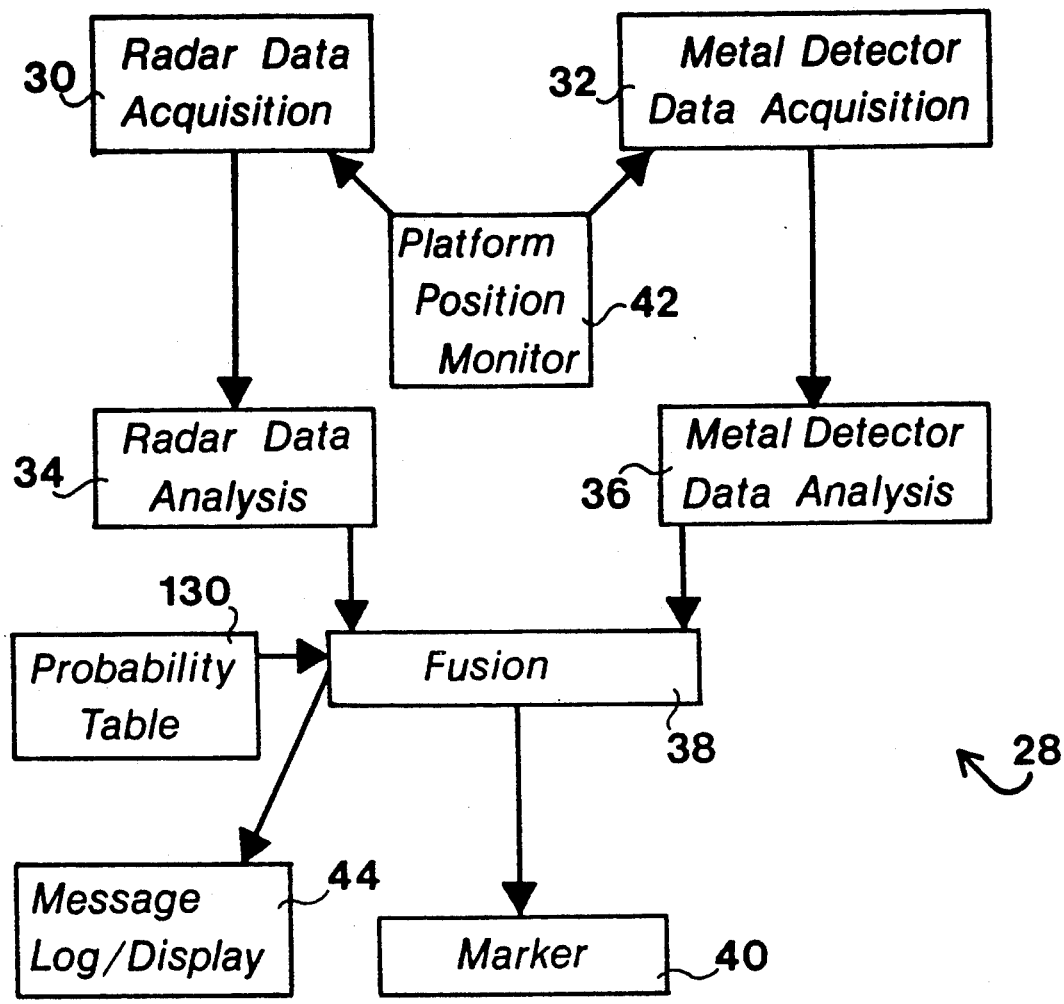
FIG. 2 is a high level flow chart showing a real time major process architecture utilized in the minefield reconnaissance and detector system of the present invention.

Now beginning a discussion of the inventive process for utilizing the best presently known embodiment 10 of the present invention, FIG. 2 is a high level flow chart showing a real time major process architecture of the mine detector process 28 utilized in the best presently known embodiment 10 of the present invention. As can be seen in the flow chart of FIG. 2, a radar data acquisition subprocess 30 and a metal detector data acquisition subprocess 32 occur simultaneously and, essentially, independently. Similarly, a radar data analysis subprocess 34 and a metal detector data analysis subprocess 36 occur simultaneously and independently, with each of the analysis subprocesses 34 and 36 acting on data from the respective acquisition subprocesses 30 and 32. As is further depicted in FIG. 2, results of the two analysis subprocesses 34 and 36 are combined and acted upon within a fusion subprocess 38. The fusion subprocess 38, in turn, provides instruction to a marker subprocess 40. Also operating in real time are a platform position monitor subprocess 42 and a message log/display subprocess 44 which will be discussed in more detail hereinafter.

Figure 3:
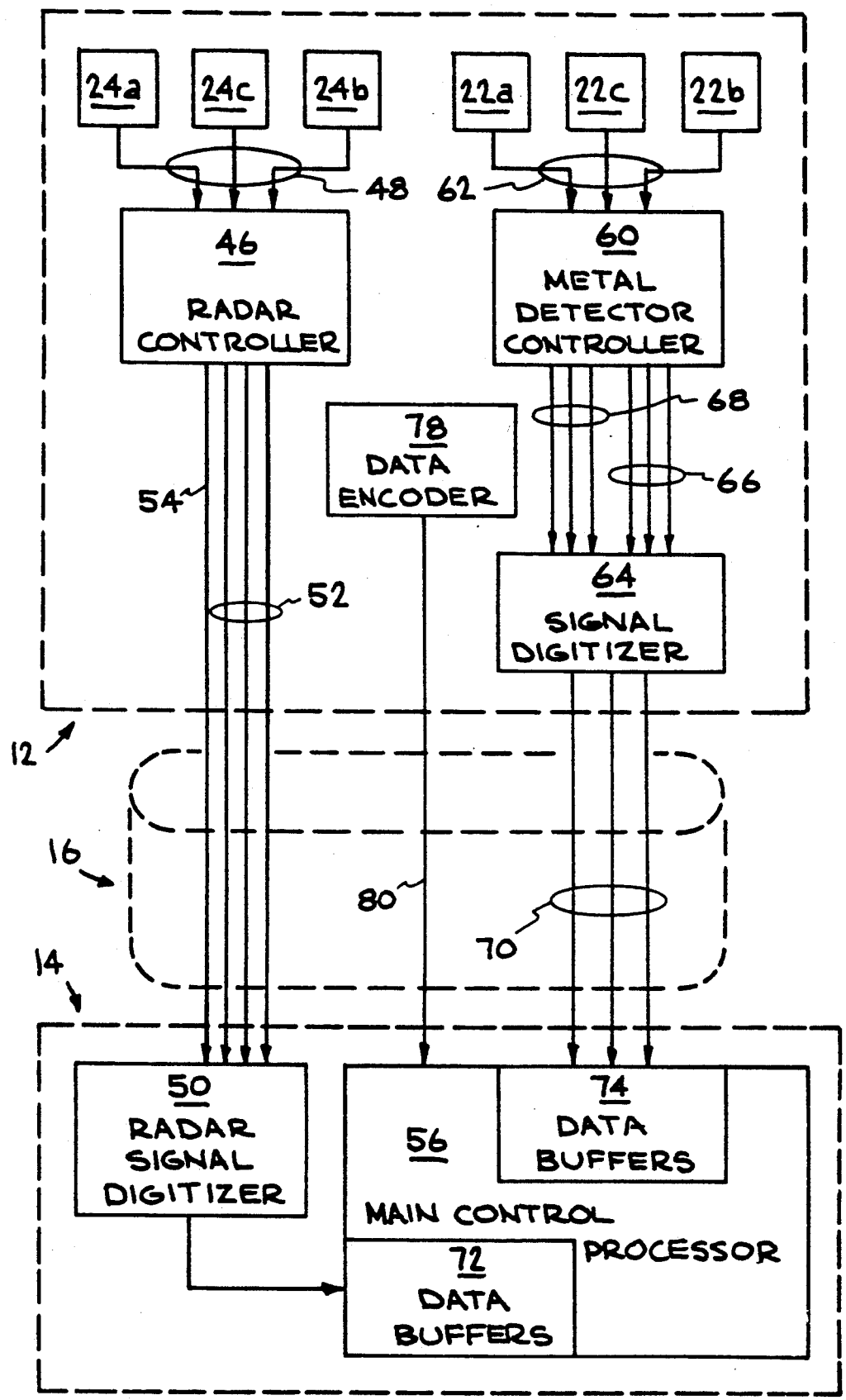
FIG. 3 is a diagrammatical representation of data flow within the minefield reconnaissance and detector system of the present invention.

Now beginning a discussion of the data acquisition subprocesses 30 and 32, FIG. 3 is a diagrammatical representation of data flow within and between the remote sensor platform 12 and the processing and control unit 14. As depicted in the view of FIG. 3, data from the short pulse radar sensors 24 is provided (in analog form, as will be discussed in more detail hereinafter) to a radar controller 46 by means of three radar sensor data lines 48. The radar controller 46 forwards the data (still in analog form) to a radar signal digitizer 50 located in the processing and control unit 14 on three radar controller data lines 52. Synchronization is provided between the radar controller 46 and the radar signal digitizer 50 by means of a radar controller synchronization line 54 such that, when a synchronization pulse is provided on the radar controller synchronization line 54, analog data instantly present at the radar signal digitizer 50 is sampled and digitized in a conventional manner. In the best presently known embodiment 10 of the invention, a synchronization pulse is provided at approximately 20 millisecond intervals on the radar controller synchronization line 54. The radar controller data lines 52 and the radar controller synchronization line 54 are located in the umbilical cable 16.

The radar signals (now in digital form) are moved from the radar signal digitizer 50 to a main control processor 56 in the processing and control unit 14 by means of an IEEE-488 communications interface cable 58. Although, as previously discussed, digitized radar waveform data is available to the main control processor 56 at a 50 Hertz rate, transmission from the radar signal digitizer 50 actually occurs only on request from the main control processor 56.

The main control processor 56 is a commercially available computer. Although essentially any computer with sufficient speed and capacity could be adapted for the purpose, the main control processor 56 of the best presently known embodiment 10 of the present invention Was chosen to be particularly adaptable for use with the UNIX operating system, which operating system is utilized in the best presently known embodiment 10 of the invention. It should be noted, however, that the present invention is by no means limited by this choice. Indeed, the inventors believe that many of the intricacies herein described as being a part of the best presently known embodiment 10 of the invention could be avoided, and the invention thus practiced more directly and simply, by the expedient of using an operating system more specifically intended for operation in a "real time" environment.

The metal detector data acquisition subprocess 32 (FIG. 2) is accomplished first by the transfer of data (in analog form) from the metal detector sensors 22 (FIG. 3) to a metal detector controller 60 via three metal detector data lines 62. The metal detector controller 60, in turn, produces two signals per metal detector sensor 22, as will be described in more detail hereinafter, which signals are forwarded to a metal detector signal digitizer 64 via three "A" signal lines 66 and three "B" signal lines 68. Signals from the metal detector signal digitizer 64 are provided to the main control processor 56 via three RS-232 lines 70 within the umbilical cable 16. Because of limitations of the band width of the RS-232 lines 70 data transfer is limited to a baud rate of 2400, although a higher baud rate would be desirable when possible.

A significant feature of the best presently known embodiment 10 of the present invention is that data from the radar signal digitizer 50 is collected in a radar data buffer 72, and data from the metal detector signal digitizer 64 is collected in three metal detector data buffers 74. As one skilled in the art will appreciate, the radar data buffer 72 and the metal detector data buffers 74 are not physical entities. Rather, they are portions of the memory of the main control processor 56 which are set aside by the software to receive and hold the respective particular data sets. As previously discussed, the data acquisition subprocesses 30 and 32 (FIG. 2) are performed autonomously for each sensor array 18 and 20. The data acquisition subprocesses 30 and 32 must perform with minimum intervention from the main control processor 56 in order to provide adequate computational resources to the data analysis subprocesses 34 and 36 and the fusion subprocess 38. Further, the data acquisition subprocesses 30 and 32 must operate at very high system priorities ensuring predictable latency limits and adequate ground coverage. Accordingly, the data buffers 72 and 74 are allocated at system startup to reduce overhead during normal operation. The data buffers 72 and 74 are managed as circular FIFO (first in, first out) data structures (also known as "ring buffers"). The concept of a ring buffer is to use a fixed length linear array in a circular fashion. On reaching the end of the allocated buffer, data pointers are reset to the beginning of the buffer.

The data buffers 72 and 74 are sized to contain all data corresponding to the distance from the corresponding sensors 22 and 24 (FIG. 1) to a marker unit 76 on the remote sensor platform 12. This constraint is logical since the data analysis subprocesses 34 and 36 and the fusion subprocess 38 must be accomplished on any given data packet before the marker unit 76 passes the ground whence that data packet was gathered.

An important feature of the implementation of the data buffers 72 and 74 is the ability of the queues to accommodate execution latencies in the demand for data from the data analysis subprocesses 34 and 36. The data analysis subprocesses 34 and 36 are allowed to execute at lower system priorities than the data acquisition subprocesses 30 and 32, since their results are only required at some time before the marker unit 76 passes over a corresponding location. On the other hand, detection performance is potentially degraded if the acquisition subprocesses 30 and 32 do not complete their functions within a narrow time window and they must, therefore, execute at the highest system priorities.

The net effect of the ring buffer approach in this system is to provide maximum tolerance to the asynchronous and time-critical nature of data acquisition subprocesses 30 and 32 and the unpredictable response latencies in the UNIX operating system. It should be noted that this arrangement is peculiar to the operation of the present invention using such a UNIX operating system, and is therefore a feature peculiar to the best presently known embodiment 10 of the present invention, as opposed to being a necessary feature of the invention.

At system startup a pair of UNIX semaphores named "data available" and "space available" are allocated for each of the raw data buffers 72 and 74. Semaphores are used here to ensure proper timing of read and write operations within these shared data areas. The data available semaphore is used to signal that new data has been validated, placed in a queue element, and is available for scoring. The acquisition subprocesses 30 and 32 control these semaphores. The space available semaphore is used to signal that analysis of data in a data buffer 72 or 74 has been completed and the space is now available for acquisition of new data.

The platform position monitor subprocess 42 (FIG. 2) operates in real time to provide an indication of the physical advancement of the remote sensor platform 12 (FIG. 1) to the main control processor 56 (FIG. 3). In the best presently known embodiment 10 of the present invention, a conventional data encoder 78 is connected to the propulsion mechanism (not shown) of the remote sensor platform 12 to provide position update data pulses to the main control processor 56 via an RS-232 position data line 80 within the umbilical cable 16. In the best presently known embodiment 10 of the present invention, a position update data pulse is provided at approximately 0.76 cm (0.30 inch) intervals such that each ten position update data pulses on the position data line 80 are interpreted by the main control processor 56 as being indicative of 7.6 cm (3 inches) of travel of the remote sensor platform 12.

The data acquisition subprocesses 30 and 32 acquire data for the data buffers 72 and 74 at predetermined intervals of travel of the remote sensor platform 12, in the case of the best presently known embodiment 10 of the invention, approximately 6.5 cm. (3.0 inches), as determined by the platform position monitor subprocess 42. Digitized data is transferred to the main control processor 56 in "packets" of data which are verified for accurate transmittal using conventional bit check techniques. In the event of a validation failure or other problem (such as system overload) which results in a missing data packet, the main control processor 56 looks at those packets adjacent in time to the missing packet and substitutes data from the "worst case" such packet for the missing packet. (What constitutes "worst case" will be discussed hereinafter.)

Figure 4:
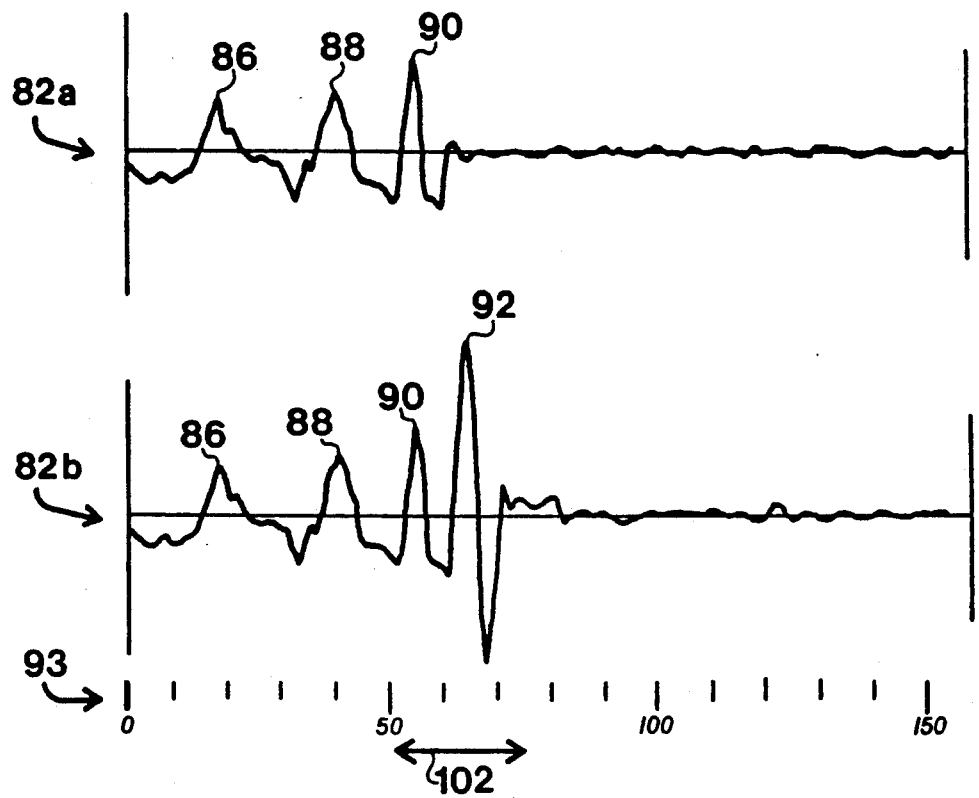
FIG. 4 is a representation of typical radar return signals to be processed within the present invention.

Now beginning a discussion of the nature of data which is gathered and processed by the best presently known embodiment 10 of the present invention, FIG. 4 is comparative representation of two radar return signals 82, specifically a "normal" radar return signal 82a as compared to an aberrant radar return signal 82b. A first signal peak 86, a second signal peak 88 and a third signal peak 90 are found in both radar return signals 82a and 82b. In the examples of the radar return signals 82a and 82b, the first and second signal peaks 86 and 88 are representative of "noise" type reflections which might be produced within the horn of the short pulse radar sensors 24, while the third signal peak 90 represents a return from the ground below the applicable short pulse radar sensor 24. A fourth signal peak 92 is representative of a signal aberration as might be produced by a Russian TmH-46 anti-tank mine buried approximately 5 cm. (2 inches) below the ground surface under the applicable short pulse radar sensor 24.

Referring again to FIG. 4, a sample point scale 93 is shown along the X axis. The sample point scale 93 denotes those points at which the radar return signals 82 are digitized within the radar signal digitizer 50. One skilled in the art of the digitizing of analog signals will recognize that the sample points delineated by the sample point scale 93 are the time reference points at which the corresponding instant amplitude of the radar return signals 82 are recorded as digital equivalents.

Figure 5:
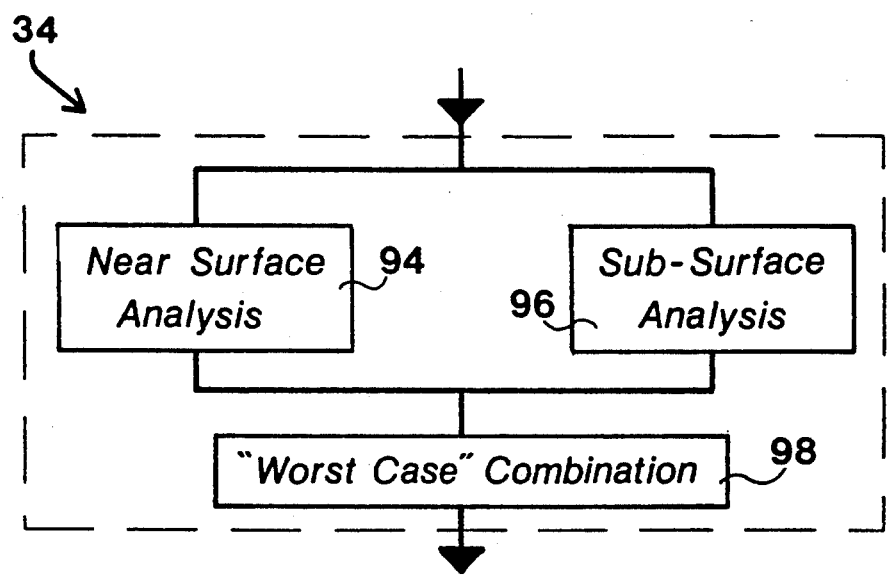
FIG. 5 is a flow chart showing subprocesses within the radar analysis subprocess shown in FIG. 2.

FIG. 5 is a flow diagram of the radar data analysis subprocess 34 of FIG. 2. As can be seen in the view of FIG. 5, the radar data analysis subprocess 34 has a near surface analysis subprocess 94, a sub-surface analysis subprocess 96 and a "worst case" combination subprocess 98. As depicted in FIG. 5, data provided for the radar data analysis subprocess 34 is separately processed in the near surface analysis subprocess 94 and the sub-surface analysis subprocess 96 and the results are combined in the worst case combination subprocess 98.

Now beginning a discussion of the near surface analysis subprocess 94, which is intended to detect objects lying on the surface of the ground or within approximately 10 cm. (4 inches) thereunder. During the operation of the best presently known embodiment 10 of the present invention, a "window" of those samples is determined which represent those portions of the radar return signals 82 being returned from such "near surface" distances. Of course, the exact figures will be dependent upon the placement of the short pulse radar sensors 24 and will vary slightly between the short pulse radar sensors 24a, 24b and 24c. Furthermore, the range will vary slightly, but significantly, with minor variations in the topology of the terrain under the short pulse radar sensors 24.

In general, the near surface analysis subprocess 94 operates to determine the energy within the near surface window 102 of the radar return signal 82 to be examined and then to compare the result With the calculated nominal (average) energy for the corresponding short pulse radar sensor 24a, 24b or 24c. In order to reduce error in the energy calculations caused by variations in the location near surface window 102 within the radar return signals 82, the radar return signals 82 are time shifted to place the third signal pulse 90 (which is, it will be remembered, the return from the ground surface) at the sixtieth sample point on the sample point scale 93. The near surface window 102 is then defined as beginning at sample point number 50 (slightly above ground level) and ending at sample point number 75 of the sample point scale 93. The following operations are then performed to accomplish the near surface analysis subprocess 94.

Any DC offset is removed from the radar return signal 82 to produce the equivalent of a zero-centered, bipolar radar return signal 82. This is done by calculating the mean amplitude of the radar return signal 82, as follows:

$$V = \frac{\left[\sum_{i=0}^{179} V_i\right]}{180}$$

where V is the mean value of all sample amplitudes; and $V_i$ is the value of the wave at sample points $i=0$ to 179; and then the mean radar return signal 82 amplitude $V_i$ is subtracted from each sample value for the radar return signal 82:

$V_{ii} = V_i - V$ for $i=0 \ldots 179$ (given a total of 180 sample points on the sample point scale 93)

where $V_{ii}$ is the adjusted value of the sample points $i=0$ to 179.

Next, the "energy" contained in that portion of the radar return signal 82 which is within the near surface window 102 is determined, according to the following calculation:

$$E = \sum_{i=50}^{75} V_{ii}^2$$

Next, a "score" is calculated for the radar return signal 82 is which is proportional to a ratio of the calculated energy to a "nominal" waveform energy (scaled between values of 0 and 63 to maximize efficiency of storage in binary form):

$$S = \frac{E}{\bar{E}} - 1.0$$

where S is a "score", and $\bar{E}$ is an "nominal" value of E, as calculated from previous measurements, as will be described in the next step.

Next, the "nominal" value E is updated, according to the most recent calculation:

$$E = \frac{9\bar{E} + E}{10}$$

Note the exponential nature of the last equation above which provides a "high pass filter" effect for rapidly changing values of E. It will be recognized that the value of nominal E will not be meaningful for the first few iterations of this calculation as the best presently known embodiment 10 of the invention "warms up", but the value of nominal E will rapidly stabilize to a usable value. The value of the nominal E calculated in this step will be used in the next iteration of the calculations.

Figure 6:
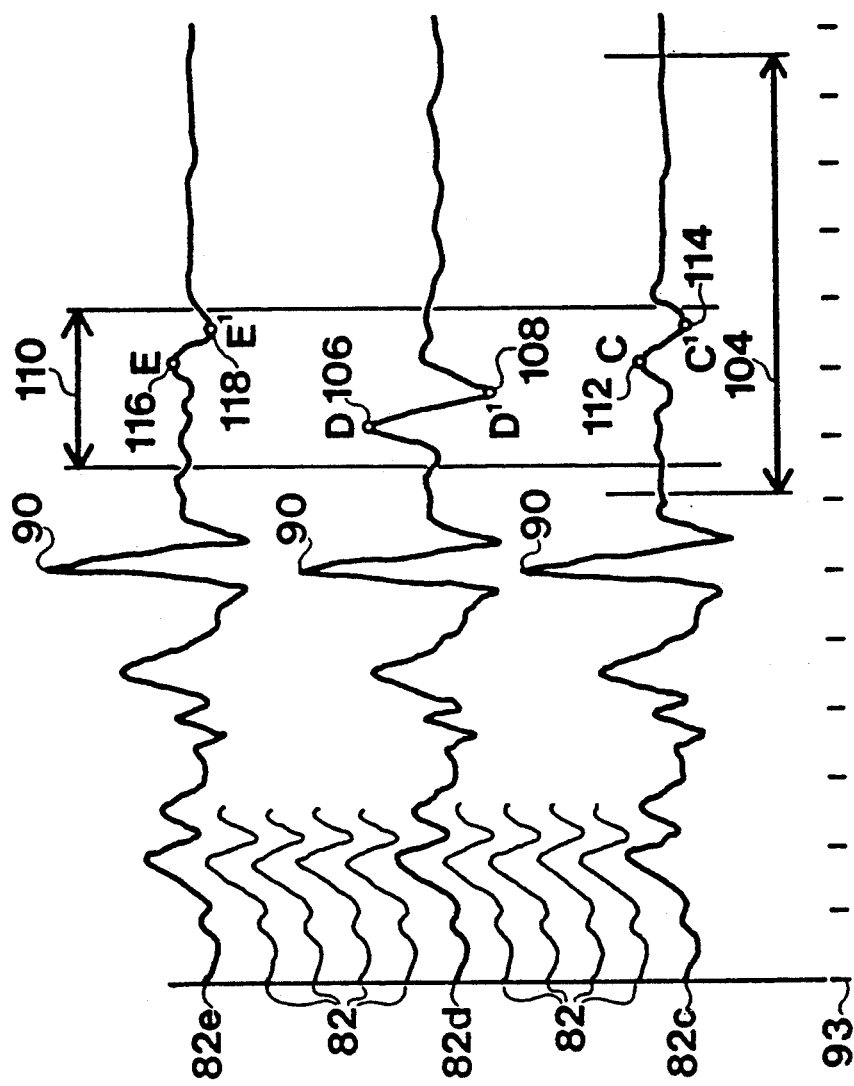
FIG. 6 is a set of radar return signals to be analyzed in a sub-surface analysis subprocess, according to the present invention.

Now beginning a discussion of the sub-surface analysis subprocess 96, in general, this subprocess compares portions of the radar return signals 82 taken at set increments of ground coverage for evidence of deeper buried mines. FIG. 6 is a representation of a series of radar return signals 82 showing the detail of a first radar return signal 82c, a sixth radar return signal 82d and a eleventh radar return signal 82e, taken from a series of eleven successive radar return signals 82. In accordance with the previous discussion, herein the first radar return signal 82c is obtained approximately 38 cm. (15 inches) prior to the sixth radar return signal 82d. Similarly, the eleventh radar return signal 82e is obtained approximately 38 cm. (15 inches) subsequent to the sixth radar return signal 82d. The position of interest in this example is that wherein the sixth radar return signal 82d is obtained. Note that detail of those of the radar return signals 82 intervening between the first, sixth and eleventh radar return signals 82c, 82d and 82e are omitted from the view of FIG. 6 for the sake of clarity.

It will be appreciated by one skilled in the art that the radar return signals 82 must be stored for at least a series of ten successive radar return signals 82. Which of the radar return signals 82 constitute the first, sixth and eleventh radar return signals 82c, 82d and 82e will increment for each successive operation of the sub-surface analysis subprocess 96. Furthermore, as described above, a calculation is not made for a specific situs (in this case, that lying directly under the point where the sixth radar return signal 82d is obtained) until the eleventh radar return signal 82e is obtained.

It should be noted that the radar return signals 82 discussed herein in relation to the sub-surface analysis subprocess 96 are time shifted such that the ground return peaks (the third signal peaks 90) are located at the sixtieth sample point of the sample point scale 93, as has been previously described herein in relation to the near surface analysis subprocess 94. For the purpose of the sub-surface analysis subprocess 96 an object search window 104 is established as being nominally from the seventieth sample point to the one hundred thirty fifth sample point of the sample point scale 93. Next the wave form maxima points D 106 and D' 108 within the object search window 104 of the sixth radar return signal 82d is established. (Since the radar return signals 82 are digitized, this is a simple numerical operation.) Next, a feature extraction window 110 is established as being from five sample points before the wave form maxima 106 to fifteen sample points after the wave form maxima 106 on the sample point scale 93.

Next, corresponding maxima within the feature extraction window 110 of the first radar return signal 82c (points C 112 and C' 114) and of the eleventh radar return signal 82e (points E 116 and E' 118) are established, in like fashion.

Next, an average amplitude reduction for both positive going maxima (C 112, D 106 and E 116) and negative going maxima (C' 114, D' 108 and E' 118) is established, according to the following calculations:

$$Q = V_D - \frac{V_C + V_E}{2}$$

where Q is the average amplitude reduction for positive going maxima C 112, D 106 and E 116; and $V_x$ is the amplitude of the radar return signal 82 at the respective points C 112, D 106 and E 116; and $$Q' = V_{D'} - \frac{V_C + V_E}{2}$$

where Q' is the average amplitude reduction for positive going maxima C' 114, D' 108 and E' 118; and $V_x$ is the amplitude of the radar return signal 82 at the respective points C' 114, D' 108 and E' 118.

Next, a differential sum of Q and Q' is scaled between 0 and 63:

$$S' = Q - Q'$$

where S' is a "score" for the sub-surface analysis subprocess 96.

Now referring again to FIG. 5, the "worst case" combination subprocess 98 within the radar analysis subprocess 34 is a simple comparison of the two scores S and S' resulting, respectively, from the near surface analysis subprocess 94 and the sub-surface analysis subprocess 96. In the best presently known embodiment 10 of the present invention, the greater of the two scores (S and S') is passed along as an output (S'') of the radar data analysis subprocess 34.

Figure 7:
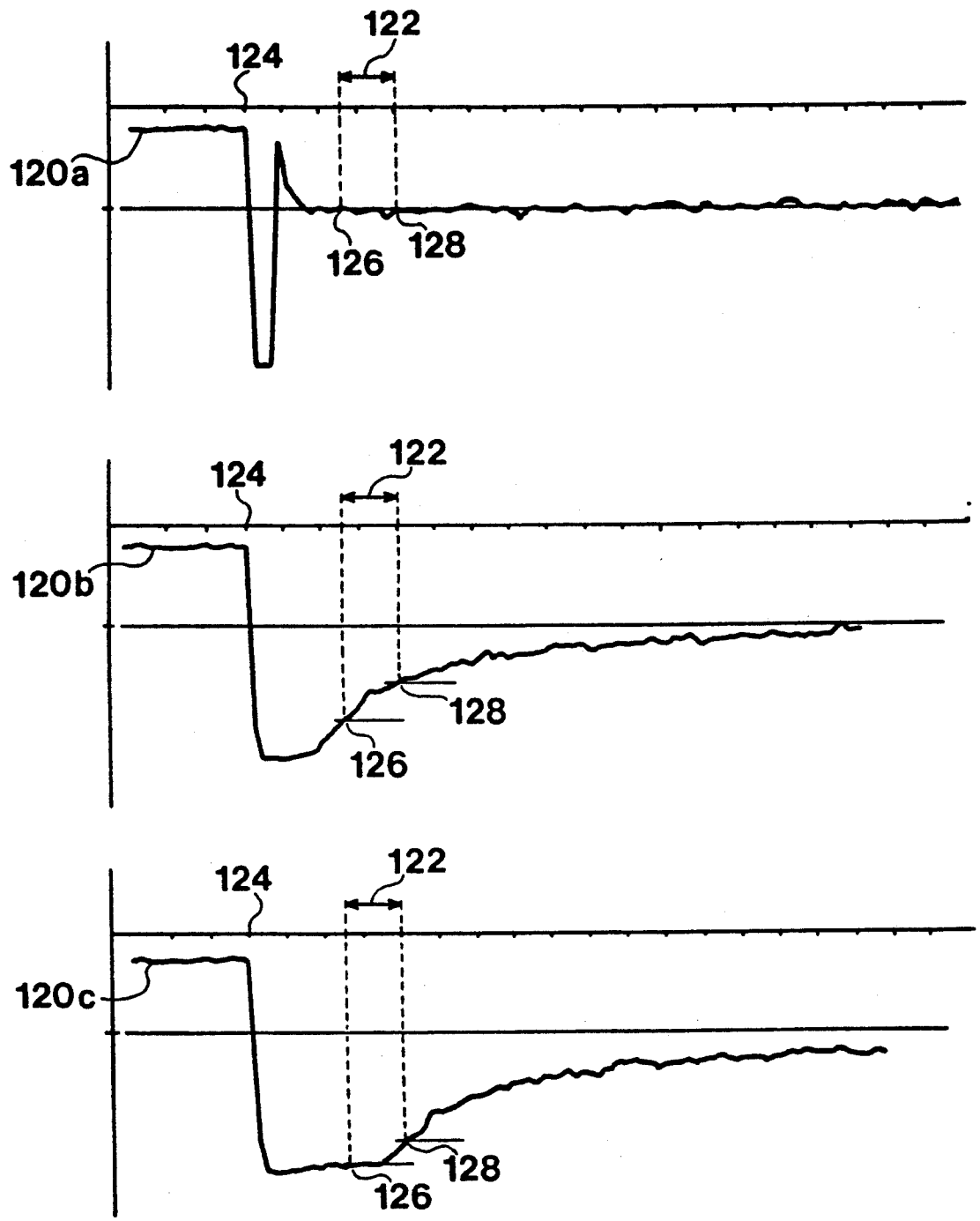
FIG. 7 is a comparative illustration of two metal detector response waveforms as used in the present invention.

Now beginning a discussion of the metal detector data analysis subprocess 36 (FIG. 2), FIG. 7 is a comparative illustration of three metal detector response waveforms 120, those being a negative indication metal detector waveform 120a, a positive indication metal detector waveform 120b which was derived by placing a M-15 anti-tank mine (not shown) directly under one of the metal detector sensors 22 (FIG. 1), and a saturation condition wave metal detector waveform 120c which is was derived by placing sufficient metal within the range of one of the metal detector sensors 22 to cause the metal detector sensor 22 to be saturated, as will be described hereinafter.

The metal detector data analysis subprocess 36 functions to measure the slope of the amplitude (Y axis) of the metal detector response waveforms 120 within a response waveform window 122 (X axis) which, in the presently preferred embodiment 10 of the present invention is set to be from approximately fifty microseconds to approximately eighty microseconds after cutoff of coil excitation voltage to the metal detector sensor 22 at a zero time point 124. The selection of the timing dimensions of the response waveform window 122 is a function of the characteristics of the metal detector sensors 22. Only minimal practical experimentation is required to select the proper dimensions for any alternative metal detector sensors 22 which might be used. Briefly, that portion of the metal detector response waveform 120 within which the slope is most affected by a metal object of the size of concern and at the distance of concern is the portion which should be selected to be the response waveform window 122.

In accordance with the operation of the conventional metal detector sensors 22 the rate of collapse of a magnetic field around the metal detector sensors 22 is indicative of the amount of metal within the field. Accordingly, the slope of the metal detector response waveforms 120 within the response waveform window 122 is a good primary indication of the presence (or absence) of a mine, with a greater slope indicating a higher probability of a mine than does a lesser slope. Accordingly, a simple comparison is made of the amplitude value of the metal detector response waveform at a first metal detector sample point 126 and a second metal detector sample point 128, with the slope being proportional to the difference between the two values obtained, as follows:

$$Z = |V_A - V_B|$$

where Z is the slope of the metal detector response waveform 120 which lies within the response waveform window 122 where $V_A$ is the amplitude of the metal detector response waveform 120 at the first metal detector sample point 126 and $V_B$ is the amplitude at the second metal detector sample point 128.

The negative indication metal detector waveform 120a has a slope approximately equal to zero within the response waveform window 122, indicating that no mine is present, while the positive indication metal detector waveform has an appreciable slope within the response waveform window 122, indicating the presence of a mine. However, note the condition exemplified by the saturation condition metal detector waveform 120b. If there is sufficient ambient metal (such as in the soil, itself) present, although the slope of a portion of the metal detector waveform 120 may be increased, the electronics of the metal detector sensor 22, having a limited dynamic range, may be "saturated" the first metal detector sample point 126, thus effectively reducing the difference between amplitudes at the first metal detector sample point 126 and the second metal detector sample point 128. At the extreme, the saturation condition may exist at both the first metal detector sample point 126 and the second detector sample point 128, thus reducing the slope within the response waveform window 122 to zero. In order to compensate for this phenomenon, as well as for calibration and system balancing errors, the following adjustments are made:

$$Z' = Z - \overline{Z}$$

where $Z'$ is a "corrected" value of the slope and $\overline{Z}$ is an "averaged" value of slopes calculated (and updated with each repeated calculation cycle) as follows:

$$\overline{Z} = \frac{49\overline{Z} + Z}{50}$$

Alternatively, a superior type of metal detector sensor 22 and related electronics might be developed which does not reach saturation so easily and which, therefore, might not require the complicated adjustments just previously described.

As described above, each iteration of the radar data analysis subprocess 34 (FIG. 2) results in a "radar score" output $S''$, while each iteration of the metal detector data analysis subprocess 36 results in a "metal detector score" output $Z'$. These scores are factored into the decision making operations of the fusion subprocess 38 to produce the desired effect of the inventive mine detector process 28. As previously discussed, the fusion subprocess 38 is a key to the operation of the best presently known embodiment 10 of the present invention. In the fusion subprocess 38, a probability value is first derived which is a best estimate of the probability of the presence of a mine, given the existent conditions. The fusion subprocess 38 uses a probability table 130 which is derived "off line" based upon results of previous operations of the inventive MIRADOR system 10. The probability table 130 consists of conventional "look up table" files each of which files is formulated for a specific soil type (e.g. sand, gravel, hard-packed clay, etc.). The best presently known embodiment 10 of the invention has, to date, six such tables to correspond to various soil conditions, although it is anticipated that, as more data is gathered, the number of such tables will increase and the delineation of different soil conditions will be continually refined. The probability table 130 is derived using simple conventional statistical analysis on archived data from prior operations of the MIRADOR system 10. A probability Value is derived for each score set ($S''$, $Z'$) in each "look up table". Accordingly, there are $64 \times 64 = 4096$ probability values in each "look up table" of the probability table 130. Each probability value is calculated as a ratio of the number of historical occurrences of the score set ($S''$, $Z'$) that were caused by the presence of a mine versus the total number of occurrences of that same score set, according to the following formula:

$$P_{mine} = \frac{N_p}{N_p + N_a}$$

where
$P_{mine}$ is the probability that a mine has been located;
$N_p$ is the number of "mine present" occurrences for the score set ($S''$,$Z'$); and
$N_a$ is the number of "mine absent" occurrences for the score set ($S''$,$Z'$).

For example, if the score set of interest is $S''$,$Z = 43,25$ then, if in the relevant historical tables of the probability table 130 this score set occurred 25 times with 21 occurrences being attributed to the presence of a mine, and 4 occurrences being attributed to some other cause, then the probability value for this score set would be entered as 0.84 (21/25). One skilled in the art of computer programming will be familiar with the construction and use of such "look up tables".

Having obtained a probability value ($P_m$) for the relevant data set (S",Z') from the probability table 130, the fusion subprocess 38 next applies a decision making process to provide an output. Of course, a simplistic approach would be to merely decree that a probability of greater than 0.5 would seem to indicate that it is more likely than not that a mine is present and to base a decision on that alone. However, such an approach would unnecessarily restrict system tuning, and would not take into account very important factors such as differences in the costs of alternative wrong decisions. Accordingly, in the best presently known embodiment 10 of the present invention, a decision is made according to an application of the Bayes Decision Rule, as follows:

If: $(C_{mn}P_{(q|n)}P_n) < (C_{nm}P_{(q|m)}P_m)$

Then: Declare that a mine is present!

where
$C_{mn}$ is the cost of incorrectly declaring a "mine present";
$C_{nm}$ is the cost of incorrectly declaring "mine not present";
$P_{(q/n)}$ is the probability of obtaining "q" as a score set given the precondition that a mine is not present;
$P_{(q/m)}$ is the probability of obtaining "q" as a score set given the precondition that a mine is present;
$P_n$ is the a priori probability that a mine is not present at the current location; and
$P_m$ is the a priori probability that a mine is present at the current location.

The above rather cumbersome decision rule reduces to a more useful form which is simple to implement, as follows:

If: $\dfrac{P_{(m|q)}}{1.0 - P_{(m|q)}} > \dfrac{C_{mn}}{C_{nm}}$

Then: Declare that a mine is present!

For the example presented heretofore wherein $P_m = 0.84$, if the values of $C_{mn}$ and $C_{nm}$ are 4 and 1, respectively (a "cost ratio" of 4/1), then:

$$\dfrac{0.84}{1.0 - 0.84} = 5.25$$

Since 5.25 is greater than 4 then the instant result would be to declare a "mine present" condition.

On completing its analysis, the fusion subprocess 38 communicates "mine present" decisions to the marker subprocess 40. The marker subprocess 40 causes the marker unit 70 on the remote sensor platform 12 to mark any spot where a mine is detected, as with a paint ball or the like. In the best presently known embodiment 10 of the present invention, hardware associated with the marker subprocess 40 is not yet fully implemented as of the time of the present application, as development efforts have been concentrated on refinement of the data analysis subprocesses 34 and 36 and the fusion subprocess 38, heretofore described. However, one skilled in the art of computer technology should have no trouble in implementing the marker subprocess 40. The only consideration not heretofore discussed is the fact that allowance must be made for distances between the sensor arrays 18 and 20 and the marker unit 76 due to the fact that data is gathered from the sensor arrays 18 and 20 ahead of the advancing marker unit 76. Since, as previously discussed herein, the data buffers 72 and 74 (and other temporary data storage "devices" not specifically discussed) hold relevant data for an interval sufficient to provide for this consideration, the implementation of the marker subprocess 40 is greatly simplified.

In addition, the marker subprocess 40 can be caused to generate a real time display showing mine detection results on a user terminal, although updating display time consumes a great deal of computational resources and may adversely affect throughput of the MIRADOR system 10 given the present hardware.

The message log/display subprocess 44 of the best presently known embodiment 10 of the present invention is rather rudimentary in nature, due primarily to the fact that the best presently known embodiment 10 of the invention is in a developmental stage as of the time of the present application. The message log/display subprocess 44, as currently embodied initiates and terminates the operations described herein, allocating memory to the queues and the like, as previously discussed. Upon termination of system operation, messages regarding any faults which may have occurred during operation are provided.

It should be noted that the data acquisition subprocesses 32 and 30, the data analysis subprocesses 34 and 36, the platform position monitor subprocess 42 and the fusion subprocess 38 are continuous and cyclical in nature such that, as described herein, mine detection is accomplished at approximately 7.6 cm (3 inch) intervals of travel of the remote sensor platform 12.

It should further be noted that power and control features of the best presently known embodiment 10 of the present invention are omitted, for the sake of clarity, from the description herein, these being entirely conventional in nature and well known to those skilled in the art.

As is shown above, in great part, the minefield reconnaissance and detector system 10 according to the present invention resemble prior art conventional metal detectors in many respects. Indeed, the metal detector sensors 22 utilized in the best presently known embodiment 10 of the invention are conventional in nature. Similarly, the short pulse radar sensors 24 utilized in the best presently known embodiment 10 of the invention are conventional. Among the substantial differences and advancements of the present inventive MIRADOR system 10 are the inclusion of the data analysis subprocess 34 and 36 wherein raw data is "scored" and further in the addition of the fusion subprocess wherein the "scores" are combined to create the ultimate product of the inventive MIRADOR system 10. No significant changes of materials are envisioned nor are any special constructions required except as described herein.

Various modifications may be made to the invention without altering its value or scope. For example, additional sensors 22 and 24 might be added to increase the area of coverage of the MIRADOR system 10 or to increase the sensitivity. Such additional sensors could be of the same type described herein as being used in the best presently known embodiment 10 of the invention, or of a different type such as infrared sensors. Any "scores" produced by such additional sensors could be combined and factored into the decision making process in the fusion subprocess 38 as described herein. Alternatively, sensors might be positioned in a "forward looking" configuration instead of or in addition to the sensors 22 and 24 described herein.

Similarly, although the invention has been described herein as using a main control processor 56 adapted for operation with the UNIX operating system, a different operating system and a different main control processor 56 could easily be applied. Indeed, an operating system specifically intended for gathering and processing data in "real time" might well be better suited for carrying out the present inventive process than is UNIX, and many of the complexities described herein as being necessary to accomplishing the best presently known embodiment 10 of the invention could be avoided by such usage. In like fashion, a more powerful main control processor 56 would make easier the task of programming to accomplish the present inventive method and would help to avoid tangential programming problems which are not directly related to the present inventive method. Furthermore, given the availability of a more powerful main control processor 56, more sophisticated scoring processes might be employed such as, for example, a frequency domain analysis of returned signals.

Yet another obvious improvement to the present inventive MIRADOR system would be to provide alternative means for transmitting data and control signals between the remote sensor platform 12 and the processing and control unit 14. As described herein, the length of the umbilical cable 16 is limited by the necessity of providing as great a bandwidth as is practical for the data to be transmitted therein. In the best presently known embodiment 10 of the present invention, the umbilical cable 16 is approximately 60 meters (200 feet) in length. Alternatively, a fiber optic cable transmission system or a radio or microwave link between the remote sensor platform 12 and the processing and control unit 14 could greatly increase the distance at which the remote sensor platform 12 might roam from the processing and control unit 14 while simultaneously enhancing data integrity.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The minefield reconnaissance and detector system 10 is adapted to be widely used in the location of concealed surface and subsurface objects. The predominant current usage is for the detection of ordnance in military applications, although the existing best presently known embodiment 10 of the invention has been used to locate buried items of toxic waste at a known toxic waste site.

The minefield reconnaissance and detector system 10 of the present invention may be utilized in any application wherein conventional mine detectors and the like are used except, perhaps, in those few locations which might be inaccessible to the remote sensor platform 12. The inventive MIRADOR system 10 has been shown to be effective in identifying many types of mines including plastic and wooden mines which frequently go undetected using conventional mine detectors. Additionally, efficiency and safety are both improved by the removal of the system operator from the test area. The improved decision making capability of the inventive MIRADOR system further assures that the critical decisions to be made by any mine detector system are consistently reliable and independent of errors caused by human stress of fatigue.

The current embodiment of the remote sensor platform 12 exerts a force of approximately 6,900 dyne/cm$^2$ (10 lb/in$^2$) to 10,300 dyne/cm$^2$ (15 lb/in$^2$) on the ground. This is insufficient to cause almost any anti-tank mine to detonate, and thus the remote sensor platform 12 will perform its function without being harmed if the mines it is to detect are anti-tank mines only. It is thought that, with minimal further development, the remote sensor platform can be caused to exert a pressure of only approximately 3,400 dyne/cm$^2$ (5 lb/in$^2$) on the ground, thus making it unlikely that the remote sensor platform would detonate even anti-personnel mines. Alternatively, the remote sensor platform may be armored to withstand the detonation of an anti-personnel mine or, with some further experimentation, an optimal trade off between light weight and additional armor might be developed. In any case, it has been demonstrated to the satisfaction of the United States Army that the inventive MIRADOR system 10 has the potential of practical application in the detection of mines.

Since the MIRADOR system 10 of the present invention may be readily constructed from basic conventional components it is expected that it will be acceptable as a substitute for conventional mine detectors. Indeed, a prototype device has already proven useful and additional MIRADOR systems, according to the present invention, are expected to be produced for the detection of mines and other surface and subsurface articles. Considerable interest has been expressed in the inventive MIRADOR system as a means of protecting and saving lives by the efficient clearing of minefields. For these and other reasons, it is expected that the utility and industrial applicability of the invention will be both significant in scope and long-lasting in duration.

CORRESPONDENCE CHART

10 MIRADOR SYSTEM
12 REMOTE SENSOR PLATFORM
14 PROCESSING AND CONTROL UNIT
16 UMBILICAL CABLE
18 FIRST SENSOR ARRAY
20 SECOND SENSOR ARRAY
21 FORWARD DIRECTION OF TRAVEL
22 METAL DETECTOR SENSORS (3)
24 SHORT PULSE RADAR SENSORS (3)
28 MAJOR REAL TIME MINE DETECTOR PROCESS ARCHITECTURE
30 RADAR DATA ACQUISITION SUBPROCESS
32 METAL DETECTOR DATA ACQUISITION SUBPROCESS
34 RADAR DATA ANALYSIS SUBPROCESS
36 METAL DETECTOR DATA ANALYSIS SUBPROCESS
38 FUSION SUBPROCESS
40 MARKER SUBPROCESS
42 PLATFORM POSITION MONITOR SUBPROCESS

44 MESSAGE LOG/DISPLAY SUBPROCESS
46 RADAR CONTROLLER
48 RADAR SENSOR DATA LINES
50 RADAR SIGNAL DIGITIZER
52 RADAR CONTROLLER DATA LINES
54 RADAR CONTROLLER SYNC LINE
56 MAIN CONTROL PROCESSOR
58 IEEE 488 COMMUNICATIONS INTERFACE CABLE
60 METAL DETECTOR CONTROLLER
62 METAL DETECTOR DATA LINES
64 METAL DETECTOR SIGNAL DIGITIZER
66 "A" SIGNAL LINES
68 "B" SIGNAL LINES
70 RS-232 LINES
72 RADAR DATA BUFFER
74 METAL DETECTOR DATA BUFFERS
76 MARKER UNIT
78 DATA ENCODER
80 POSITION DATA LINE
82 RADAR RETURN SIGNALS
82a NORMAL" RADAR RETURN SIGNAL
82b ABERRANT RADAR RETURN SIGNAL
82c FIRST RADAR RETURN SIGNAL
82d SIXTH RADAR RETURN SIGNAL
82e ELEVENTH RADAR RETURN SIGNAL
86 FIRST SIGNAL PEAK
88 SECOND SIGNAL PEAK
90 THIRD SIGNAL PEAK
92 SIGNAL ABERRATION
93 SAMPLE POINT SCALE
94 NEAR SURFACE ANALYSIS SUBPROCESS
96 SUBSURFACE ANALYSIS SUBPROCESS
98 "WORST CASE" COMBINATION SUBPROCESS
102 NEAR SURFACE WINDOW
104 OBJECT SEARCH WINDOW
106 WAVE FORM MAXIMA D
108 POINT D'
110 FEATURE EXTRACTION WINDOW
112 POINT C
114 POINT C'
116 POINT E
118 POINT E'
120a, b, and c METAL DETECTOR RESPONSE WAVEFORMS
122 RESPONSE WAVEFORM WINDOW
124 ZERO TIME POINT
126 1ST METAL DETECTOR SAMPLE POINT
128 2ND METAL DETECTOR SAMPLE POINT
130 PROBABILITY TABLE

We claim:

1. A method for determining the presence of objects on or under the surface of the ground, comprising the steps of:
   a. obtaining a plurality of response signals from a plurality of sensor devices;
   b. digitizing each of the response signals such that the response signals can be stored in a digital computer and further such that calculations can be performed using the response signals as data within the digital computer;
   c. analyzing each of the response signals to detect anomalous signal characteristics, if present in the response signal, and assigning a score to each of the response signals, which score is proportional to an estimated probability that any such anomalous signal characteristic present in the response signal is indicative of the presence of an anomalous object;
   d. combining the scores into score sets and comparing the score sets with a known outcome given historical incidence of identical score sets;
   e. repeating steps a. through e. incrementally as the sensor devices are moved over the surface of the ground; and
   f. applying a decision rule to produce a decision based upon historical data and a determination of the relative cost of a false negative decision versus the cost of a false positive decision.

2. The method of claim 1, wherein:
   a marker device is caused to mark those locations on the surface of the ground where said response signals result in a decision that an object is present.

3. The method of claim 1, wherein:
   the plurality of sensor devices includes a plurality of metal detector sensors and further includes a plurality of short pulse radar sensors.

4. The method of claim 3, wherein:
   said metal detector sensors and said short pulse radar sensors are arranged with each one of said metal detector sensors paired with one of said short pulse radar sensors; and
   the scores sets are pairs of scores obtained from one of said metal detector sensors and the corresponding one of said short pulse radar sensors.

5. A mine detection device for detecting the presence of land mines and similar objects, comprising:
   a self propelled mobile platform for propelling, under remote control, a plurality of sensor devices over the surface of the ground;
   a control unit from which the mobile platform is remotely steered and controlled and to which a plurality of signals from said sensor devices are provided; and
   signal conducting means for conducting signals between said mobile platform and said control unit, wherein;
      said plurality of sensor devices is arranged in a plurality of sensor arrays with each of said sensor arrays having therein a like number of said sensors, each of said sensor arrays being a linear array with said linear array positioned perpendicular to a direction of travel of the mobile platform; and
      each of said signals from each of said sensors is separately analyzed to determine if it includes an aberration indicative of a mine and a score is established for each of said signals to indicate the probability of a mine present condition.

6. The mine detector of claim 5, wherein:
   said plurality of sensor devices includes at least one metal detector, and each of a series of said signals from said metal detector is analyzed in steps including;
   a. digitizing said signal;
   b. examining at least a portion of said signal to determine the slope of that portion of said signal; and
   c. producing a probability figure indicative of the likelihood that such slope indicates the presence of a mine.

7. The mine detector of claim 5, wherein:
   said plurality of sensor devices includes at least one short pulse radar sensor, and each of a series of said signals from said short pulse radar sensor is analyzed in steps including;
a. digitizing said signal;
b. determining the location of a ground return portion of the signal;
c. establishing a sample window in fixed relationship to said ground return portion of said signal; and
d. determining the energy represented by that portion of said signal which lies within said sample window to produce a calculated waveform energy.

8. The mine detector of claim 7, wherein:
said score for each of said radar sensor signals is established to be proportional to a ratio of said calculated waveform energy as compared to a nominal waveform energy, said nominal waveform energy being an average of prior calculated waveform energies.

9. The mine detector of claim 5, wherein:
said plurality of sensor devices includes at least one short pulse radar sensor, and each of a series of said signals from said short pulse radar sensor is analyzed in steps including;
a. digitizing each of a series of said signals;
b. determining the location of a ground return portion of each of said series of signals;
c. establishing an object search window in fixed relationship to said ground return portion of each of said signals;
d. locating a waveform maximum point within said object search window;
e. establishing a feature extraction window in relation to said waveform maximum point;
f. determining an average high amplitude reduction of said maximum point as compared to at least some of said signals preceding and succeeding a signal presently under analysis;
g. locating a waveform minimum point within said object search window;
h. determining an average low amplitude reduction of said minimum point as compared to at least some of said signals preceding and succeeding said signal presently under analysis; and
i. determining a differential sum of said average high amplitude reduction and said average low amplitude reduction.

10. The mine detector of claim 5, wherein:
said scores from at least some of said sensor devices are combined to produce a score set, and said score sets are compared to a data table, said data table being a correlation of each possible score set to the proportional incidence of a mine present condition existing, given the corresponding one of said score sets.

11. The mine detector of claim 10, wherein:
said data table is selected from a plurality of data tables with each of said data tables of said plurality of data tables having been derived from data gathered under a defined set of conditions such that each of said data tables is specifically suited for specific conditions under which the mine detector might be used.

12. The mine detector of claim 10, wherein:
a decision is made by application of an adaption of Bayes Decision Rule.

13. The mine detector of claim 10, wherein:
a decision is made to declare a mine present condition or, alternatively, to declare a mine not present condition based upon information derived from said data table and a relative assessment of a cost of incorrectly declaring said mine present condition as compared to a cost of incorrectly declaring said mine not present condition.

14. The mine detector of claim 13, wherein:
a marker device is activated to mark a location of a mine when said mine present condition is declared.

* * * * *